(12) United States Patent
Frohnhaus et al.

(10) Patent No.: US 7,207,541 B2
(45) Date of Patent: Apr. 24, 2007

(54) LOCKING DEVICE WITH SEVERAL LOCKING PINS

(75) Inventors: Ernst-Reiner Frohnhaus, Solingen (DE); Klaus Kautzner, Hilden (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 0 days.

(21) Appl. No.: 10/306,257

(22) Filed: Nov. 27, 2002

(65) Prior Publication Data

US 2003/0164434 A1  Sep. 4, 2003

(30) Foreign Application Priority Data

Nov. 28, 2001 (DE) ............... 101 58 145
Jan. 17, 2002 (DE) ............... 102 01 581
Sep. 14, 2002 (DE) ............... 102 42 829

(51) Int. Cl.
  *F16M 13/00* (2006.01)
  *B60N 2/42* (2006.01)
  *G05G 5/06* (2006.01)

(52) U.S. Cl. ............... 248/429; 248/424; 297/216.16; 74/527

(58) Field of Classification Search ............... 248/429, 248/430, 424, 548, 423; 297/216.15, 216.16, 297/216.18, 216.17, 216.19; 74/527, 538
See application file for complete search history.

(56) References Cited

U.S. PATENT DOCUMENTS 4,189,957 A    2/1980  Gedig et al.
5,234,189 A *  8/1993  Myers ............... 248/429
5,560,262 A * 10/1996  Orzech ............... 74/527
5,564,315 A * 10/1996  Schuler et al. ............... 74/527
5,816,110 A * 10/1998  Schuler et al. ............... 74/527
5,913,947 A *  6/1999  Groche ............... 74/527
5,918,846 A *  7/1999  Garrido ............... 248/429
6,113,051 A *  9/2000  Moradell et al. ............... 248/430
6,308,589 B1* 10/2001  Schuler et al. ............... 74/538
6,764,054 B2*  7/2004  Becker et al. ............... 248/429

FOREIGN PATENT DOCUMENTS

DE     29700866     *   1/1997
DE     197 09 149 A1    9/1998
DE     29910720     *   8/1999
EP     0 408 932 A2     1/1991

* cited by examiner

*Primary Examiner*—Anita King
*Assistant Examiner*—Tan Le
(74) *Attorney, Agent, or Firm*—Akerman Senterfitt

(57) ABSTRACT

A locking device of a longitudinal adjustment device of a vehicle seat is provided with a catch bar with periodically arranged snap openings and snap studs that is assigned to a bottom rail of the longitudinal adjustment device and is further provided with a locking unit assigned to a seat rail of the longitudinal adjustment device. The locking device has at least two licking pins that can be inserted into the snap openings independent of one another, they can be disengaged only jointly. The locking pins are arranged in a guide member which has a pin bore for each locking pin. The guide member is provided with an area facing the catch bar. Projections projecting toward the catch bar are arranged on this area and extend as a continuation of the pin bore.

18 Claims, 3 Drawing Sheets

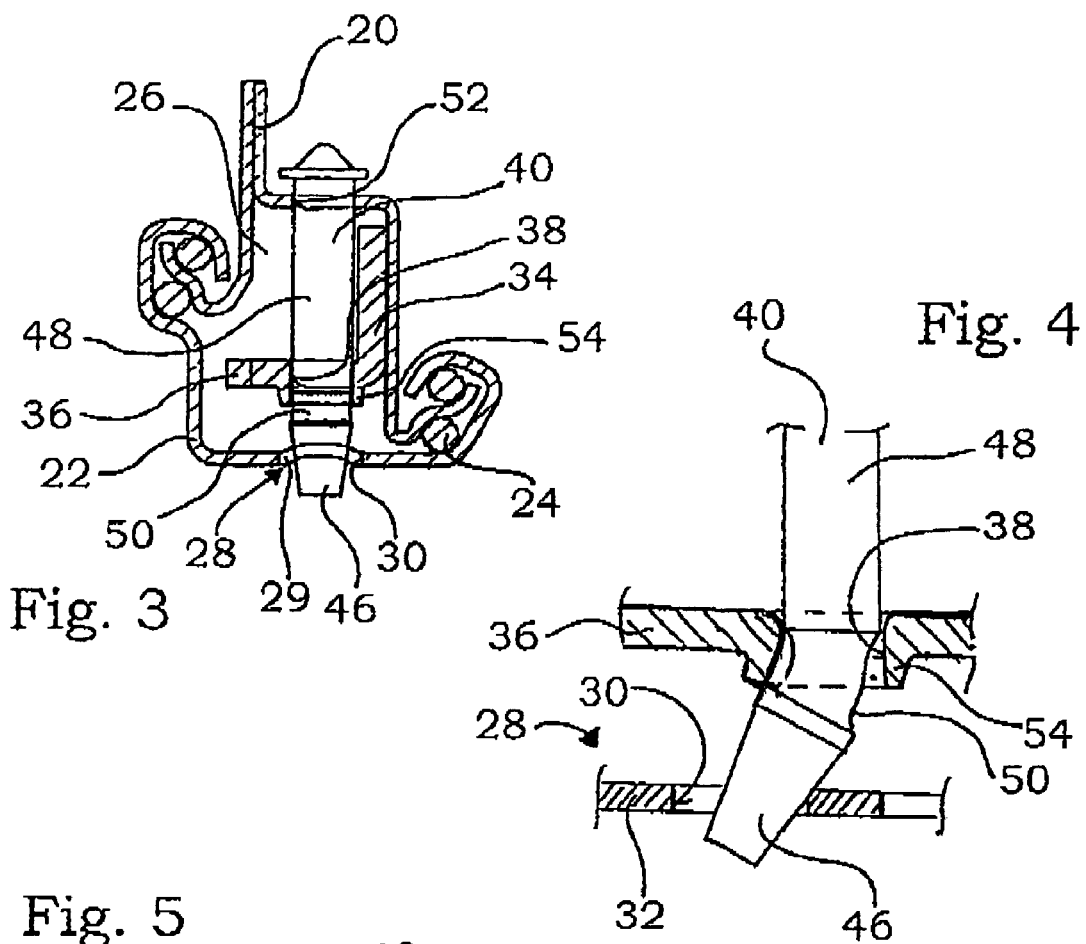
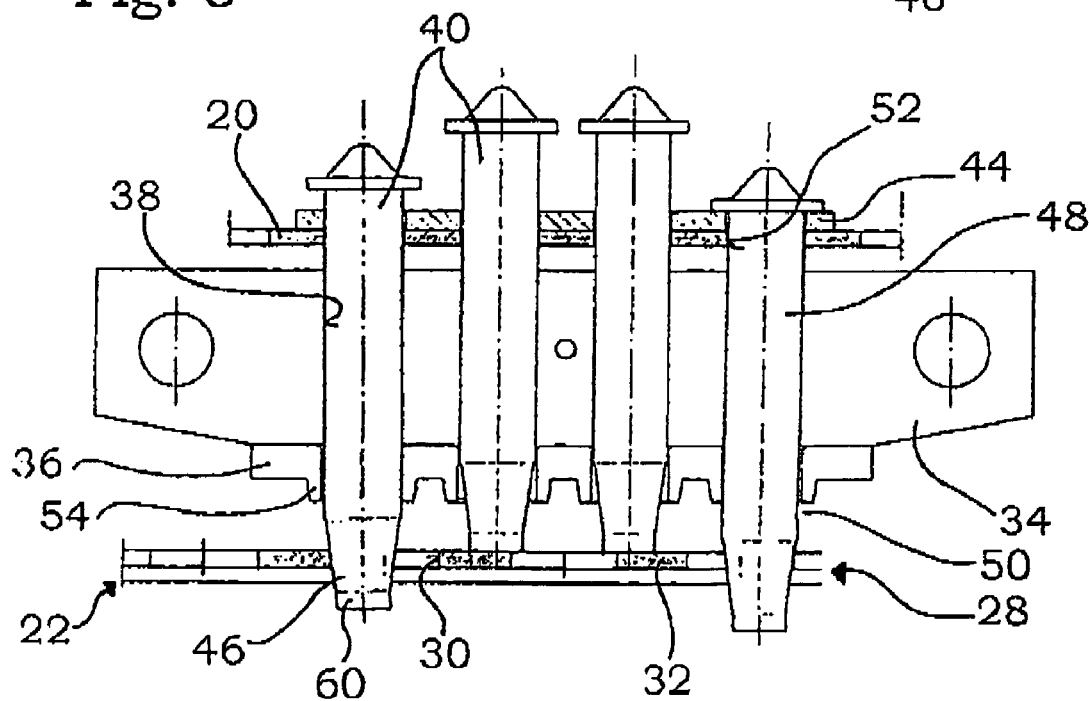

LOCKING DEVICE WITH SEVERAL LOCKING PINS

FIELD OF THE INVENTION

The invention relates to a locking device of a longitudinal, i.e. lengthwise adjustment device of a vehicle seat. The locking device is provided, on the one side, with a catch bar having periodically alternating snap openings and snap studs. The catch bar is assigned to a bottom rail of the longitudinal adjustment device. On the other side, the locking device is provided with a locking unit assigned to a seat rail of the longitudinal adjustment device. The locking unit has at least two locking pins that can be inserted into snap openings independent of one another and can jointly be retracted therefrom. The locking pins are arranged in a guide member having a pin bore for each locking pin.

DESCRIPTION OF PRIOR ART

Such a locking device has been previously proposed in DE 197 09 149 A. Further relevant prior art is also described in EP 408 932 B and DE 27 29 770 C. This type of locking device is also termed a multiple pin locking device. These devices permit a fine pitched and sensitive longitudinal adjustment. In the locked position, a locking pin fits beside a snap stud. Usually, it is a sloping side of the locking pin that fits beside a snap stud. The sloping sides are formed by truncated regions on the free end of the locking pins for example. A locking pin locks in one direction of displacement. Another locking pin locks in the other direction of displacement.

Since generally but one locking pin is responsible for locking one direction of displacement, under crash load all of the locking forces act onto that one locking pin and onto the corresponding snap stud on which the locking pin is resting. Under high load conditions, the corresponding forces intentionally cause the locking pin to bend, as has already been described in DE 197 09 149 A mentioned herein above. Now, if a locking pin bends, the angle between the locking flank thereof and the snap stud changes. The angle increases. Before, it was within the range of self-locking, but after bending, it may be outside of this range. If it is outside of this range, said forces exerted onto the locking pin can push the locking pin upward, meaning out of the locking condition. The locking pin must however be prevented from disengaging from the corresponding snap stud in order not to release the locking state.

SUMMARY OF THE INVENTION

This is where the invention comes to bear. The object of the invention is to further develop the locking device of the type mentioned herein above in such a manner that the locking pins are prevented from being pushed upward out of a locking position in an accident situation.

In view of the locking device of the type mentioned herein above, the solution to this object is to provide the guide member with an area facing the catch bar, to arrange projections projecting toward the catch bar on said area and to have the projections extending as a continuation of the pin bores.

The guide member thus has a projection protruding downward toward the catch bar for at least one of the pin bores, preferably for each pin bore. The projections extend as a continuation of the respective one of the pin bores.

The projections are preferably annular. In any case, the projections allow for softer and more flexible guidance of the locking pins than in the region of the pin bore of the guide member. That is to say that they offer less resistance than the guide member to a locking pin bending laterally outwards. Under crash load, the projections are bent as well. They may more specifically warp, interlock and be brought into clutched engagement with the locking pin. As a result thereof, the locking pins are prevented from being pushed out of their locking position in an accident situation.

Thanks to the invention the guide member may be made of steel. In current state of the art devices, the guide members are mainly made of aluminium. The length of the guidance in the current state of the art devices is much greater than in the device of the invention. In the above mentioned DE 197 09 149 A for example, the length of the guidance is relatively great, greater than 8 mm for example. The material of preference used for the guide member of the invention has a thickness ranging from about 3 to 4 mm, and is generally comprised between 2 and 5 mm. The projection considerably increases the length of the pin bore by preferably 20 to 120%.

At least one locking pin, more specifically all of the locking pins, are preferably provided with a groove which is located in proximity to the corresponding pin bore, more specifically to the projection. The groove is also termed a crash groove. In the region of said crash groove, the locking pin is slightly tapered, e.g., by between 5 and 15%, preferably by about 8%. Moreover, toward the free end of the locking pin, the crash groove preferably has a sharp-edged transition to the intact cylindrical sheath where it more specifically forms a stop face.

The above mentioned DE 197 07 149 A teaches to provide recesses such as blind bores, indentations and so on it front of and behind the pin bores in the guide member. Plastic deformation of the guide member in its lower portion is thus facilitated. But it describes no projections protruding downward from a lower face of the guide member. Furthermore, no crash groove capable of engaging with a projection is described.

In an improved embodiment of the invention it is suggested to configure the projections to form rimmed holes. For this purposes, one pilot hole for each pin bore is first made in the guide member, said pilot hole having a diameter which is considerably smaller that that of the completed pin bore and amounts to 60% of the diameter of the completed pin bore for example. Now, the pilot hole is enlarged by means of a punch the outer dimensions of which correspond to the pin bore, a respective projection being formed in the process. The projections are connected to, and integral with, the guide member. In another embodiment, the projections may be realized by separately inserting a material, such as slide bushes for example.

It proved particularly advantageous to provide a bead in the catch bar, said bead being curved upward toward the guide member. As a result thereof, the catch bar is mechanically reinforced and the stability of a locking condition is increased. The bead may comprise any cross section, such as send-circular, triangular or trapezoidal.

In a particularly preferred embodiment, the groove is realized by a plurality of individual grooves. Three almost evenly spaced individual grooves may fir example be provided side by side. The at least one groove and the individual grooves preferably have a truncated bottom that tapers toward the free end of the looking pin. A stop face is preferably configured on the end of each groove, or of each individual groove, said stop face pointing toward the free end of the locking member. At their free ends, the locking pins advantageously have a short, cylindrical front end.

The fluting formed by several individual grooves efficiently prevents the locking pin from being pushed upward out of its locking position in an impulse-like or in a slow manner. As soon as the locking pin is slightly bent in the event of an accident, the several individual grooves provide many possibilities for interlocked and clutched engagement. Several individual grooves that may interact with the material of the guide member at the lower end of the pin bore are available so that the locking pin is prevented from moving up ward.

The fluting also slightly weakens locally the locking pins so that these preferably warp in the region of the fluting. This is where the locking pins also offer the largest area for abutment on the region about the lower end of to pin bore.

The reduction in the diameter of the locking pins in the region of the fluting is chosen, on the one side, to be great enough, so that the stop face provided is great enough to provide a good mechanical interlock and, on the other side, is chosen not so great that the locking pin is markedly weakened and risks to beak in the region of the fluting in the event of an accident. What is wanted is a selective deformation in the region of the fluting.

To configure the crash groove in the form of several individual grooves arranged side by side provides the advantage that, under load, the locking pins are better brought into interlocked and clutched engagement with the projections in the region thereof. As a result thereof, dynamic effects caused by the pin bouncing up under crash load are reduced.

It finally proved advantageous to configure the locking pins to have a round shape, but the pin bores to have a non round shape. This more specifically applies to the region of the projections. Under a defined load, the projections may plastically deform. As a result thereof, the edges of the grooves, or of the individual grooves, are allowed to better engage into the projection.

Further advantages and characteristics of the invention will become apparent in the other claims and in the following non restrictive description of embodiments given by way of example only with reference to the drawing.

BRIEF DESCRIPTION OF THE DRAWINGS

FIG. 3 is a sectional view taken along line II—II of FIG. 2, FIG. 4 is a detail shown in a view similar to FIG. 2 of an engaged locking pin bent after a crash to explain the clutch effect, FIG. 5 is a side view according to FIG. 2 of another exemplary embodiment of a locking unit.

DESCRIPTION OF THE PREFERRED EMBODIMENTS

The first exemplary embodiment according to the FIGS. 1 through 4 is described herein after. Then, the other exemplary embodiments will be described as far as they differ from the first embodiment.

Figure 1:
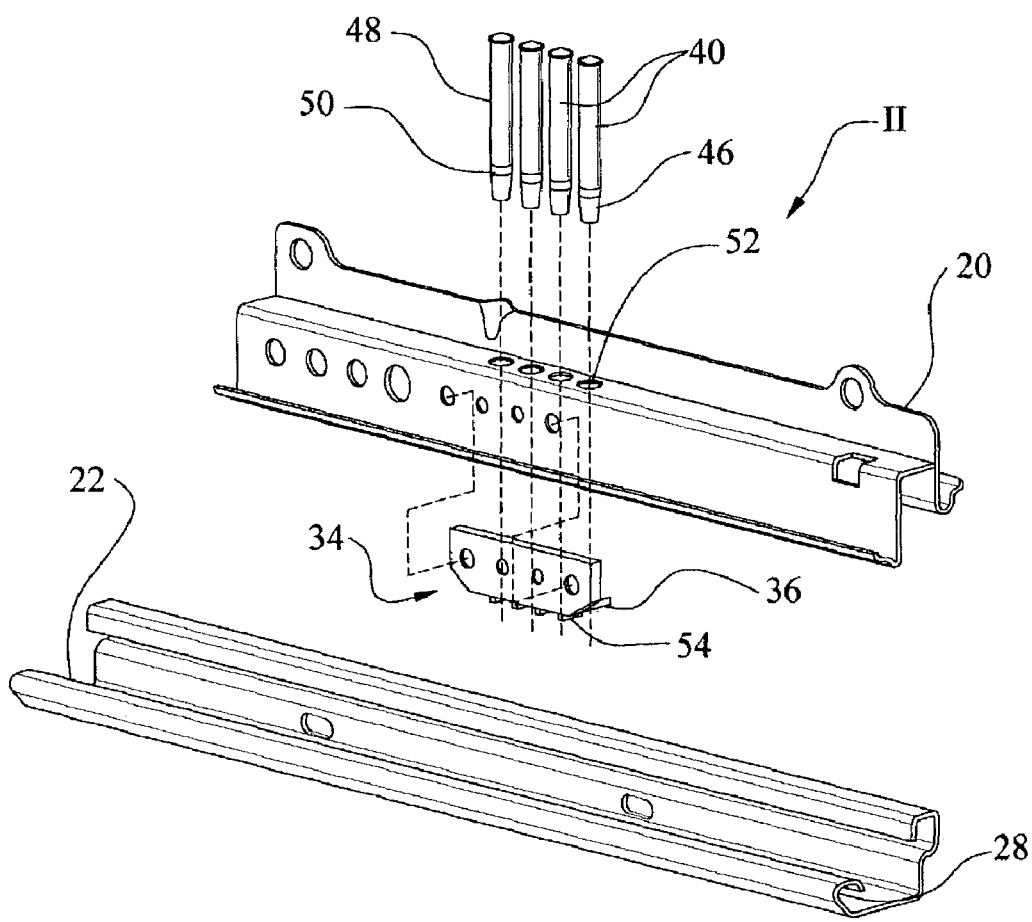
FIG. 1 is a perspective assembly drawing of a longitudinal guide with seat rail and bottom rail, a locking unit with four locking pins and one guide member being allocated thereto.
Figure 2:
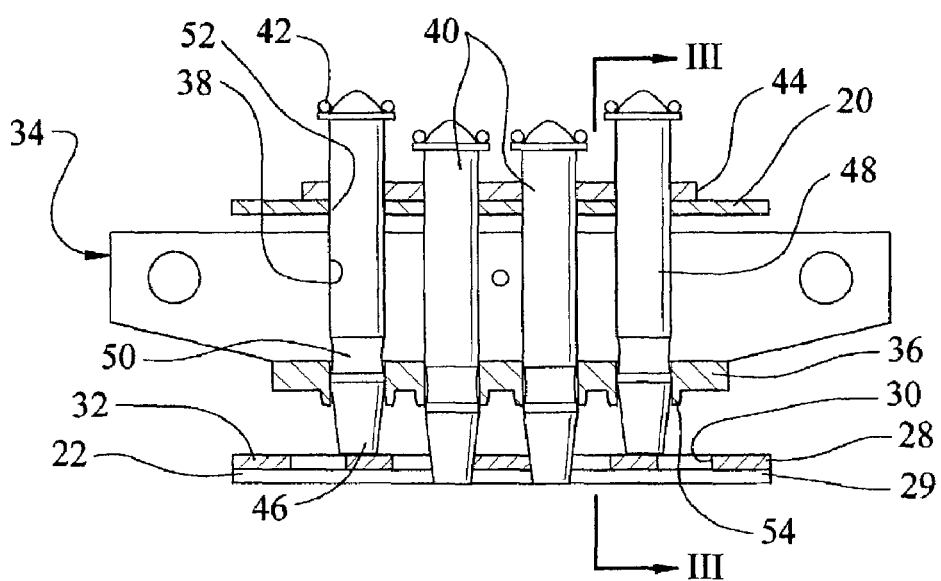
FIG. 2 is a rear side of the arrangement depicted in FIG. 1, viewed in the direction indicated by the arrow II in FIG. 1, this time in the assembled and engaged condition.

The FIGS. 1 through 3 each depict one pair of rails consisting of a seat rail 20 and a corresponding bottom rail 22. The rails are relatively slidable by way of suited sliding or rolling means configured as balls 24 (see FIG. 3). As may be more specifically surveyed from FIG. 3, the seat rail 20 consists of two assembled individual sections. The two rails 20, 22 form the boundary of an elongate hollow space 26. The lower leg of bottom rail 22 is configured as a catch bar 28 extending in the longitudinal direction of the rail. Said catch bar 28 has periodically arranged snap openings 30, also termed windows, and snap studs 32. As more specifically shown in the FIGS. 2 and 3, the catch bar 28 is located in an upwardly bent elongated bead 29 formed in rail 22. At the summit of the bead 29, the material of the lower flange of the bottom rail is bent upward by about 1.5 to 2 mm. The width of bead 29 approximately corresponds to the width of catch bar 28. The offset formed by bead 29 may be surveyed more specifically from FIG. 2. The catch bar 28 is reinforced by the bead 29.

An L-shaped angular section 34 is located in the hollow space 26, the vertical leg or second flange of the L of said angular section being fastened to the inner face of a vertical flange of seat rail 20. A first flange or free leg of said angular section 34 forms a guide member 36. Four pin bores 38 are provided therein. Each pin bore 38 receives a locking pin 40 which, in the exemplary embodiment shown, is rotationally symmetrical. The locking pins 40 are all built according to the same principle. Non round pins, e.g., such as with a square cross section, are possible.

The locking pins are individually biased by a spring 42 into a locking position and may be jointly pulled into the release position by way of a release member 44. This needs not be discussed in detail, the reader is referred to the already mentioned EP 408 932 B.

As shown in the Fig., the locking pins 40 are slightly longer than the height of the hollow space 26. With their upper actuation region, they always remain outside of the seat rail 20 and, in the locked condition, their free end engages into a snap opening 30.

In the first embodiment, the lower, free end of the locking pins 40 is formed by a truncated region 46. At the upper end thereof, it turns into a cylindrical region 48. This region however is interrupted, just above where it begins, by a groove, also termed a crash groove. The cylindrical region 48 is tapered in the region of the groove 50. At its lower end, the groove 50 has a sharp-edged transition to the intact cylindrical region 48, this condition being still more obvious in the other exemplary embodiments.

The locking pins 40 are moreover guided in holes 52 in an upper leg of seat rail 20. Said holes 52 are located from the guide member 36 at a distance that is considerably greater than half the length of the locking pins. Generally speaking, this results in the locking pins 40 being efficiently supported over a great distance, a large lever arm being thus created.

Beneath each pin bore there is a projection 54 that extends downward as a continuation of the pin bore. It is preferably configured to form a rimmed hole, which will be discussed later, any configuration is possible in principle, though. It is connected to, and integral with, the remaining portion of the guide member 36 and is formed in the material thereof. In the axial direction, its length corresponds to about 60% of the material thickness of the guide member 36. In the radial direction, the annular projections 54 are relatively thin, their material thickness ranges from 1 to 3 mm.

If the projections 54 are configured as rimmed holes in the embodiment of preference, the process is as follows: at first, pilot holes are drilled at the location of the future pin bores 38, said pilot holes having for example approximately 60% of the diameter of the future pin bore 38. Then, a tool, more specifically a pin, is driven through the pilot hole to enlarge said pilot hole until it meets the size of the pin bore 38, said pin forming, as it exits, the projection 54 together with that portion of pin bore 38 extended as a continuation by said projection.

To provide the clutched engagement in accordance with the invention, that portion of the projection is substantially needed that, viewed from the center of a pin bore 38, is located in the longitudinal direction of the rails 20, 22. In the transverse direction, the projection may be flatter.

As more specifically depicted in the FIGS. 2 to 4, the groove 50 for those locking pins which are engaged is located slightly beneath the lower end of the corresponding projection 54 in the region thereof. As a result thereof, when, in the event of an accident, the locking pin 40 is pushed upward and additionally warped (see FIG. 4), a lower edge of the groove 50 abuts on the neighboring edge of projection 54 in the warp direction. This allows for the desired interlock in an accident condition. The lower boundary of groove 50 is preferably edged or is oriented approximately at right angles with the axis of the pin. The greatest possible stop face is thus achieved, which prevents the locking pin 40 from bouncing upward.

The projections 54 are located on the lower face of guide member 36 and in proximity to the snap stud 32. The spacing between guide member 36 and snap stud 32 is slightly smaller than the axial length of the truncated region 46.

The guide member 36 is made of a steel with a yield point value of 260 N/mm$^2$. The locking pins 40 are also made of steel, but of a steel having a much higher yield point, of 600 N/mm$^2$ for example. The material thickness of the guide member 36 is approximately 3.5 mm. The projections protrude approximately 2 mm downward and have a wall thickness of about 1.5 mm. The projections 54 make the pin guidance softer and longer. In their cylindrical region 48, the locking pins 40 have a diameter of about 7.5 mm. The pin bore 38 is a hole with an inner diameter of about 7.8 mm. The rails 20, 22 are made of a very hard steel, the yield point of which is even higher than that of the material of which the locking pins 40 are made. In the region of crash groove 50, the diameter of the locking pins tapers to about 6.9 mm. The axial length of groove 50 is slightly smaller than the axial length of the complete pin bore 38, i.e., in the guide member 36 and in the projection 54.

No groove is provided in the embodiment according to FIG. 5. In FIG. 5, the far right locking pin 40 is fully snapped in, it cannot be engaged any further. The two central locking pins 40 are disengaged. The far left locking pin 40 is engaged, but not completely lowered so that possible play may still be compensated for. On account of the point contact between the locking pin and projection 54, the achievable interlock is still sufficient even in this condition in the event of a bending occasioned by an accident, see FIG. 8.

Figure 6:
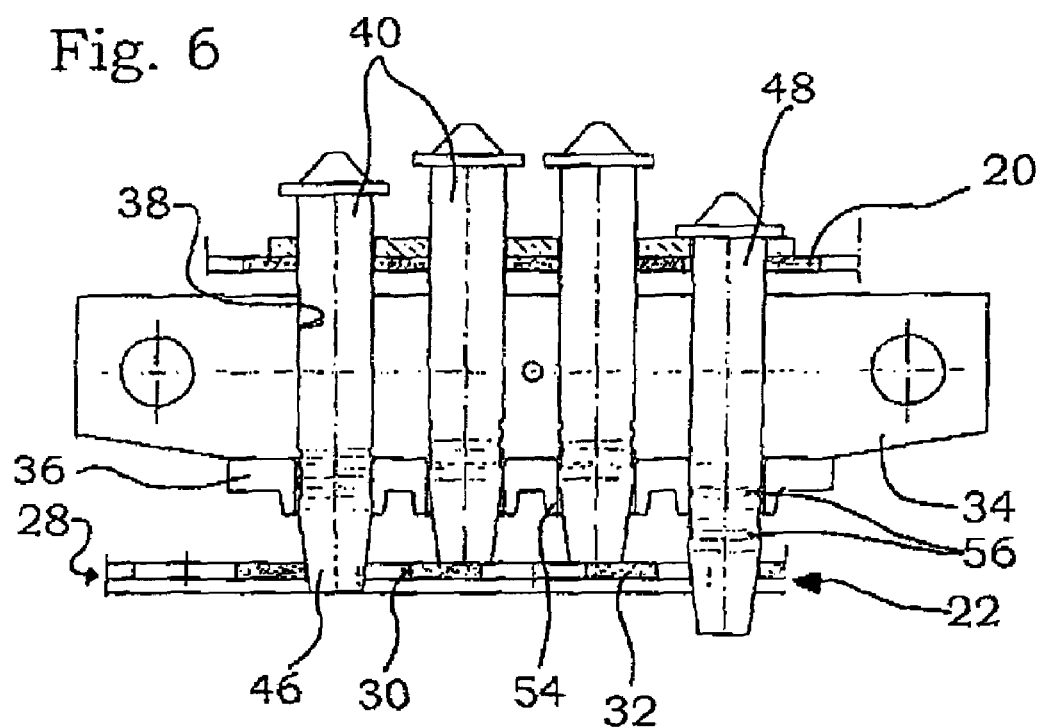
FIG. 6 is an embodiment similar to FIG. 5, but now with the locking pins provided with several individual grooves forming together the crash groove.

FIG. 6 depicts a configuration similar to that of FIG. 5, a groove 50 is again provided, said groove being formed by a plurality of individual grooves 56. Between the individual grooves, the locking pin 40 has again the diameter of the cylindrical region 48. As a result thereof, the guidance of the locking pin 40 within pin bore 38 is enhanced. The several individual grooves 56, with their increased number of lower groove edges, provide more options for the projection 54 to engage with. The pin guidance is also enhanced. Three respective individual grooves 56 are provided in FIG. 6. They extend over an axial length which is considerably greater than the axial length of the single groove 50 in the previous embodiments. In factual terms, they extend over approximately 70% of the maximum distance the locking pins 40 are capable of travelling. The length of the maximum travel also substantially corresponds to the axial length of the truncated region 46.

The individual grooves have an axial measurement of e.g., 2 to 4 mm. An intact region with a full cross section of approximately 0.1 to 3 mm in axial dimension remains between two individual grooves.

Figure 7:
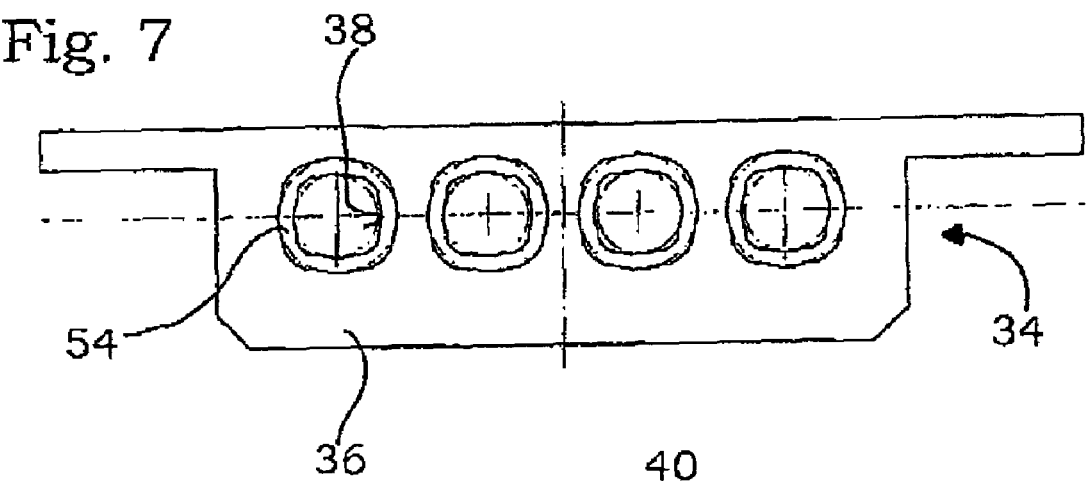
FIG. 7 is a bottom view of a guide member with a non round pin bore and with non round contours in the region of the projections, the guide member being part of an L-shaped angular section

In the embodiment of FIG. 6, the pin bores 38 are moreover non round, as more specifically shown in FIG. 7. By contrast, the pins are round. In fact, the cross sections of the pin bores 38 in FIG. 7 are approximately cushion-shaped, approximating the shape of a square with rounded corners. As a result thereof, there is still enough guide area on the one side. On the other side, plastic deformation is allowed to take place in the region around the pin bore 38. Said plastic deformation occurs under a defined load, as it is encountered in an accident situation. The groove edges are allowed to better engage.

Figure 8:
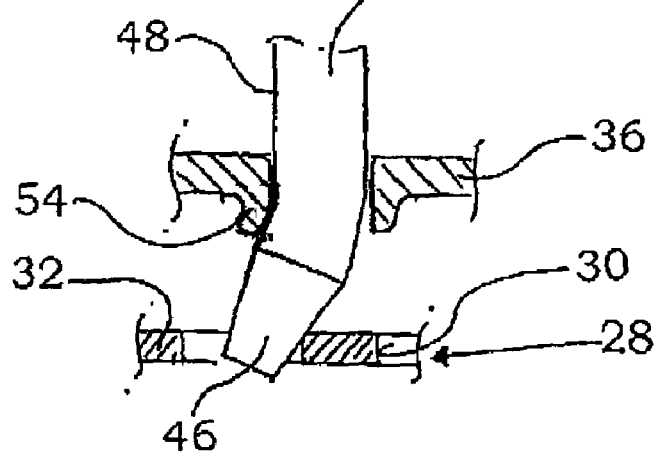
FIG. 8 is a view of a locking pin in the clutched engagement like in FIG. 4, but now with several individual grooves.

Finally, FIG. 8 shows, in a way similar to that in FIG. 4, how the locking pin 40 in the bent condition is utilized in the embodiment in accordance with FIG. 5. It may be surveyed that interlocked engagement between the locking pin and the projection 54 has been achieved.

The lower, free border of the projections 54 is preferably sharp-edged. The projections 54 are preferably hardened, e.g., case hardened. The projections 54 are more specifically formed at those locations toward which the locking pin may be bent, that is to say in the direction of longitudinal adjustment. In the transverse direction, that is to say across the longitudinal direction of the rails, the projections 54 may be dispensed with, be configured to be low, and so on.

The invention claimed is:

1. A locking device of a longitudinal adjustment device of a vehicle seat, comprising:
   a seat rail having holes;
   a bottom rail that is slidably coupled to the seat rail, wherein the seat rail and the bottom rail form a hollow space therebetween;
   a catch bar that is positioned at the bottom rail, the catch bar having periodically arranged snap openings and snap studs;
   a plurality of locking pins; and
   a guide member that is positioned in the hollow space between the seat rail and the bottom rail, the guide member comprising:
      a structure that projects into the hollow space, the structure having:
         an upper surface that opposes a lower surface of the seat rail; and
         a lower surface that opposes an upper surface of the catch bar;
      a plurality of pin bores that are formed in the structure for receiving corresponding locking pins, wherein the pin bores extend between the upper surface and the lower surface of the structure;
      a plurality of projections that are formed along a perimeter of the plurality of pin bores on the lower surface of the structure, the plurality of projections protruding beyond the lower surface of the structure toward the upper surface of the catch bar and including a slot or an opening between adjacent projections to form at least two projections between adjacent locking pins;

wherein the locking pins are configured to pass through the corresponding holes, the corresponding pin bores, and the corresponding snap openings to engage the seat rail, the guide member and the catch bar and prevent lateral movement between the seat rail and the bottom rail.

2. The locking device according to claim 1, wherein the guide member has a material thickness and the projections have an axial length amounting to 20 to 120% of the material thickness of the guide member.

3. The locking device according to claim 1, wherein the guide member has a material thickness and the plurality of projections protrude beyond the lower surface of the structure by an amount that is approximately equal to 50 to 70% of the material thickness of the guide member.

4. The locking device according to claim 1, wherein the guide member has a material thickness of two to five mm, and is made of steel, wherein the locking pins are made of steel, and wherein the material of the guide member has a lower yield point than the material of the pins.

5. The locking device according to claim 4, wherein the guide member has a material thickness of three to four mm.

6. The locking device according to claim 1, wherein the material of the guide member has a yield point amounting to half of that of the material of the locking pins.

7. The locking device according to claim 1, wherein the guide member comprises an L-shaped angular section having a first flange and a second flange, the structure being formed by the first flange, and the second flange being connected to the seat rail.

8. The locking device according to claim 1, further comprising a bead that is formed in the catch bar, the bead protruding upward toward the guide member.

9. The locking device according to claim 8, wherein the bead protrudes upward by about 1.5 to 2 mm.

10. The locking device according to claim 1, wherein at least one locking pin is provided with a grooved structure that is located in proximity to the corresponding pin bore.

11. The locking device according to claim 10, wherein the plurality of locking pins comprise a first portion having a truncated region; and a second portion having a cylindrical shape, and wherein the grooved structure located within the second portion.

12. The locking device according to claim 10, wherein the grooved structure is formed by at least two individual grooves.

13. The locking device according to claim 1, wherein the plurality of projections are formed integral with the plurality of pin bores.

14. The locking device according to claim 1, wherein the plurality of projections have a material thickness ranging from 1 to 3 mm.

15. The locking device according to claim 1, wherein a spacing between the lower surface of the structure and the upper surface of the catch bar is slightly smaller than the axial length of the first portion of the plurality of locking pins.

16. A locking device of a longitudinal adjustment device of a vehicle seat, said longitudinal adjustment device having a seat rail with holes and a bottom rail, said locking device comprising:

a catch bar that is positioned at the bottom rail, the catch bar having periodically arranged snap openings and snap studs;

a plurality of locking pins having a first end, a second end and a middle, wherein the middle is defined to be midway between the fist end and the second end in an axial direction, the plurality of locking pins comprising:

an upper actuation region that is defined above the middle of the locking pins;

a lower actuation region that is defined below the middle of the locking pins; and a guide member that is positioned in a hollow space between the seat rail and the bottom rail, the guide member having a structure with a material thickness of 2.0–5.0 mm in the axial direction, the structure projecting into the hollow space and having a plurality of pin bores for receiving corresponding locking pins, the structure being configured to contact the lower actuation region of the plurality of locking pins such that the upper actuation region of the plurality of locking pins is exposed to the hollow space; and wherein the plurality of pin bores extend between an upper surface and a lower surface of the structure and wherein the guide member further comprises a plurality of projections that formed on the lower surface of the structure along a perimeter of the plurality of pin bores, the plurality of projections protruding beyond the lower surface of the structure toward an upper surface of the catch bar;

wherein the locking pins are configured to pass through the corresponding holes, the corresponding pin bores, and the corresponding snap openings to engage the seat rail, the guide member and the catch bar and prevent lateral movement between the seat rail and the bottom rail.

17. A locking device of a longitudinal adjustment device of a vehicle seat, said longitudinal adjustment device having a seat rail and a bottom rail, said locking device comprising:

a catch bar that is positioned at the bottom rail, the catch bar having periodically arranged snap openings and snap studs;

a plurality of locking pins having a first end, a second end and a middle, wherein the middle is defined to be midway between the fist end and the second end in an axial direction, the plurality of locking pins comprising:

an upper actuation region that is defined above the middle of the locking pins; and a lower actuation region that is defined below the middle of the locking pins; and a guide member that is positioned in a hollow space between the seat rail and the bottom rail, the guide member comprising:

a structure that projects into the hollow space;

a plurality of pin bores positioned on the structure for receiving corresponding locking pins;

a plurality of projections that are formed along a perimeter of the plurality of pin bores on a lower surface of the structure, the plurality of projections protruding beyond the lower surface of the structure toward an upper surface of the catch bar and including a slot or an opening between adjacent projections to form at least two projections between adjacent locking pins, the plurality of projections being configured to contact the lower actuation region of the plurality of locking pins upon bending of the of the plurality of locking pins.

18. A locking device of a longitudinal adjustment device of a vehicle seat, said longitudinal adjustment device having a seat rail and a bottom rail, said locking device comprising:
   a catch bar that is positioned at the bottom rail, the catch bar having periodically arranged snap openings and snap studs;
   a plurality of locking pins; and
   a guide member that is positioned in a hollow space between the seat rail and the bottom rail, the guide member comprising:
      a structure that projects into the hollow space, the structure having a lower surface that opposes an upper surface of the catch bar;
      a plurality of pin bores that are formed in the structure to extend through the structure from an upper surface to a lower surface for receiving corresponding locking pins;
      a plurality of projections that are formed along a perimeter of the plurality of pin bores on the lower surface of the structure, the plurality of projections protruding beyond the lower surface of the structure toward the upper surface of the catch bar in a range of between 1 to 3 mm and including a slot or an opening between adjacent projections to form two projections between adjacent locking pins;
   wherein the locking pins are configured to engage the seat rail, the guide members and the catch bar to prevent lateral movement between the seat rail and the bottom rail.

* * * * *